United States Patent [19]

Haussecker

[11] Patent Number: 5,347,214
[45] Date of Patent: Sep. 13, 1994

[54] METHOD AND DEVICE FOR SETTING THE SHORT CIRCUIT MOMENT IN ELECTRIC MOTORS, PARTICULARLY IN SERVOMOTORS

[75] Inventor: Walter Haussecker, Buehlertal, Fed. Rep. of Germany

[73] Assignee: Robert Bosch GmbH, Stuttgart, Fed. Rep. of Germany

[21] Appl. No.: 941,930

[22] Filed: Sep. 8, 1992

[30] Foreign Application Priority Data

Sep. 5, 1991 [DE]  Fed. Rep. of Germany ....... 4129495

[51] Int. Cl.$^5$ ............................................. G01R 31/02
[52] U.S. Cl. ........................ 324/158 MG; 364/571.01
[58] Field of Search ................. 324/158 MG, 74, 130; 364/571.01, 550, 551.01; 340/648; 29/596; 318/433, 434

[56] References Cited

U.S. PATENT DOCUMENTS

| | | | |
|---|---|---|---|
| 4,879,671 | 11/1989 | Rieder et al. | 364/571.01 |
| 4,939,678 | 7/1990 | Beckwith, Jr. | 364/571.01 |
| 5,018,087 | 5/1991 | Dannenberg | 324/130 |

OTHER PUBLICATIONS

"Die Prüfung elektrischer Maschinen und die Untersuchung ihrer magnetischen Felder" (Testing Electrical Machines and Examination of their Magnetic Fields); W. Nürnberg, Springer-Verlag, Berlin, Heidelberg, New York; 1965; pp. 82, 83 (no month).

*Primary Examiner*—Ernest F. Karlsen
*Attorney, Agent, or Firm*—Spencer, Frank & Schneider

[57] ABSTRACT

A method and a device are proposed for setting the short circuit moment in electric motors, particularly in servomotors. for this purpose, the actual short circuit moment of the electric motor is measured and compared with a predetermined short circuit moment. Then the set short circuit current required to attain the desired moment is calculated. A predetermined value for the set short circuit current, which is a function of the calculated value, is then stored in an electronic control device for the electric motor. For this purpose, the device includes a memory in the control device for storing the predetermined set value. In this way it is possible in a simple and economical manner to equip even motors that are produced in manufacturing series and in which greater component tolerances exist, with a short circuit moment that lies within a narrow tolerance range.

8 Claims, 1 Drawing Sheet

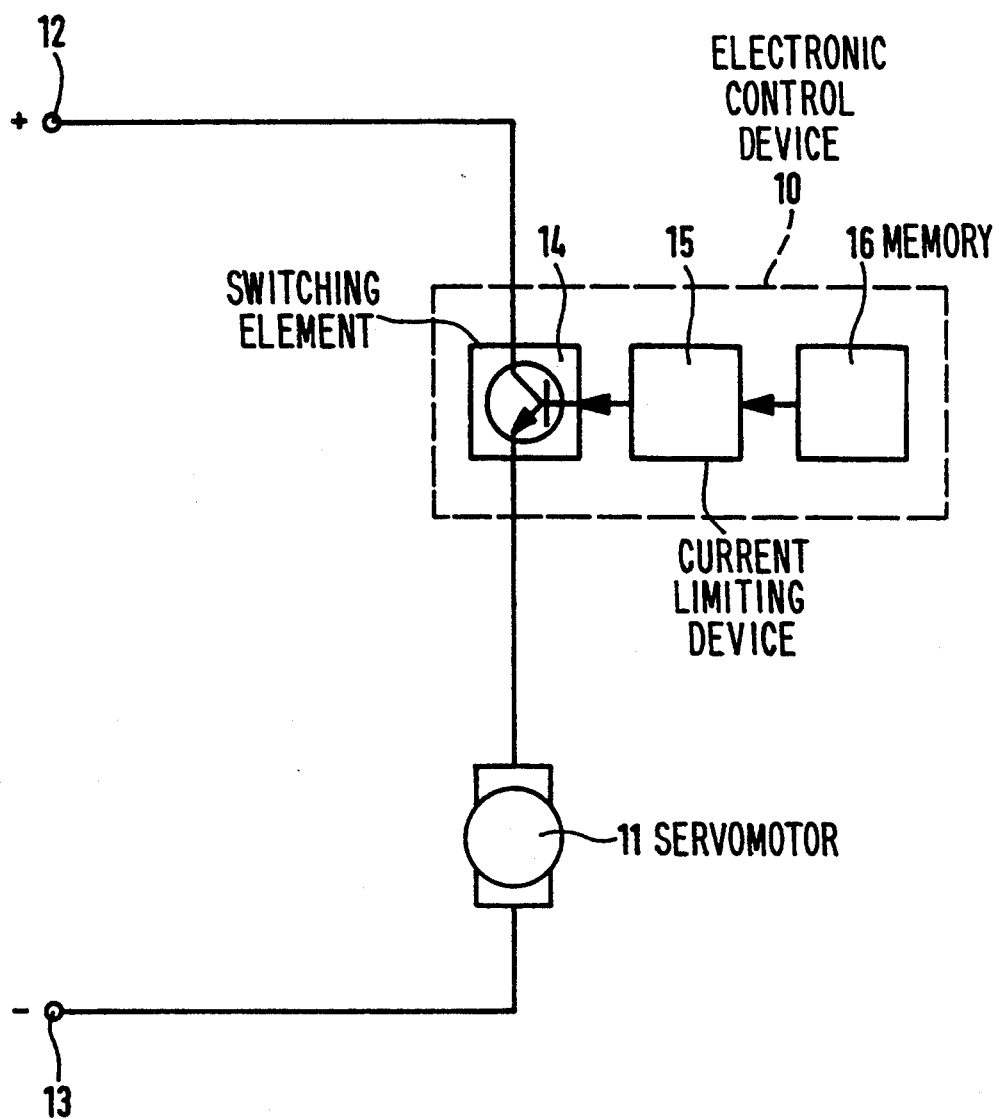

METHOD AND DEVICE FOR SETTING THE SHORT CIRCUIT MOMENT IN ELECTRIC MOTORS, PARTICULARLY IN SERVOMOTORS

CROSS REFERENCE TO RELATED APPLICATION

This application claims the priority of application Ser. No. P 41 29 495.5-32, filed Sep. 5, 1991, in the Federal Republic of Germany.

BACKGROUND OF THE INVENTION

The present invention relates to a method and to a device for setting the short circuit moment in electric motors, particularly in servomotors.

In connection with electric motors, particularly servomotors, it is usually required that the tolerance range of the adjustment or motor forces lies within very narrow limits. The short circuit moment, that is, the torque when the motor drive shaft is held immobile, is proportional to the actuation forces of the system equipped with the motor. However, in practice there exist a large number of power influencing tolerances of the individual components of an electric motor so that a large margin of error results for the short circuit moment in the conventional manufacturing and installation methods which is undesirable and also not permissible in many applications.

To obtain electric motors that have a narrower tolerance range, it has been the practice in the past to subject the motors to an appropriate test and to reject those displaying values outside of the tolerance range. However, this is a very expensive method and, in addition, the tolerance range cannot be made arbitrarily small if costs are to be kept within an economically justifiable range. Another known possibility to obtain a narrow tolerance range for the short circuit moment is the use of very high quality and high precision components. However, this way also leads to high costs.

ADVANTAGES OF THE INVENTION

The method, according to the invention, of setting the short circuit moment in electric motors, particularly servomotors, that a very narrow tolerance range can be realized in a simple manner for the short circuit moment, with it being possible to employ economical, mass produced articles for the individual components of the electric motor, that is, the servomotor. Compared to the prior art, the tolerance range can be narrowed considerably and the number of rejects can be reduced. With the method according to the invention, no additional individual components and no modifications to existing individual components are required, but merely a modification or adaptation of a stored value. The device according to the invention, for setting the short circuit moment in electric motors, particularly servomotors, equipped with an electrical control device exhibits the corresponding advantages.

Advantageous modifications and improvements of the method and the device according to the invention are possible.

The calculation of the short circuit current $I_{ks}$ to be set can be made in a simple manner according to the following equation:

$$M_{ks} = c * I_{ks} - M_v$$

where $M_{ks}$ is the desired short circuit moment, c is a constant and $M_v$ is the loss moment of the electric motor. Advisably the actual short circuit current $I_{ki}$ is measured in this connection.

The maximum motor current can then be limited or regulated in a simple manner as a function of the stored value for the set short circuit current $I_{ks}$, without it being necessary to make any structural modifications or additions.

As a feature of the apparatus according to the invention for setting the short circuit moment in electric motors, the memory may be configured in a simple manner as a matchable or adjustable resistance arrangement. This may be realized by a potentiometer or a plurality of individual resistors. In the latter case, means for burning out such individual resistors are provided in a known manner for matching. To simplify and reduce the costs of manufacture and to realize the smallest possible structural height, the resistors may be configured as integrated resistors or film resistors.

However, the memory may also be configured as an electronic memory, for example as an EPROM or EEPROM. The electronic storage of the memory value is particularly simple and is suitable for mass production of such electric motors or servomotors.

Advisably, the memory is a component of a current limiting device in the electronic control unit, with the short circuit current value $I_{ks}$ to be set stored in the memory determining the current limiting value. In electric motors equipped already with an electronic control device and/or with a current limiting device, the costs for setting the desired short circuit moment $M_{ks}$ are again noticeably reduced.

This applies correspondingly for the case where the memory is a component of a current regulating device in the electronic control device, in which case the value for the short circuit current to be set as stored in the memory determines the set value in the current regulating device. Here again, very little cost is involved if a current regulating device is already provided.

In order to realize a lower structural height, the electrical or electronic control device may also be integrated within the electric motor.

BRIEF DESCRIPTION OF THE DRAWING

One embodiment of the invention is illustrated in the drawing and will be described in greater detail below. The sole figure is a block circuit diagram for an apparatus according to the invention for setting the short circuit moment in electric motors.

DETAILED DESCRIPTION OF THE PREFERRED EMBODIMENT

In the embodiment shown in the drawing figure, an electronic control device 10 is connected in series with an electrical servomotor 11, with this series connection being charged with a direct supply voltage by way of two supply terminals 12 and 13. However, the invention is not limited to servomotors, other electric motors, for example, alternating current or three-phase current motors may also be equipped with a device for setting the short circuit moment. Additionally, the electronic control device 10 may also act in a different manner on servomotor 11 or on the electric motor, for example, a parallel connection may also be provided.

The electronic control device 10 includes an electronic switching element 14 that is connected in series with servomotor 11 and is configured, for example, as a transistor, thyristor, triac or the like. This electronic switching element 14 is controlled by a current limiting device 15, with the current limiting value being predetermined by way of a memory 16. Memory 16 may be configured as an electronic memory, for example an EPROM or EEPROM, thus making storage of the current limiting value easy by way of purely a software program. Another possibility is to configure memory 16 as a resistance network in which case a plurality of resistors connected in this network are configured as integrated resistors or film resistors. The storage of the current limiting value is then effected in a known manner by burning out individual resistors to obtain in this way the desired resistance value which, in turn, determines the current limiting value. A conventional solution is, for example, the use of a potentiometer.

The purpose of the described arrangement is to provide a defined short circuit moment with a narrow tolerance range for servomotor 11. Since the short circuit moment is a function of a corresponding short circuit current, the value for the corresponding short circuit current is determined and stored in memory 16. In this way, the short circuit moment to be set is indirectly predetermined.

An alternative possibility is to provide, instead of the current limiting device 15, a current regulating device which likewise acts on electric switching element 14. The short circuit current to be set is then likewise provided as a set value by way of memory 16.

The method of setting the desired short circuit moment resides in that initially the actual short circuit moment $Mki$ of servomotor 11 is measured without any influence from a current limiting or current regulating device. The actual short circuit moment $Mki$ is then the torque exerted by servomotor 11 when the drive shaft is prevented from rotating. The following relationship exists between the actual short circuit moment $Mki$ and actual short circuit current $Iki$:

$$Mki = c*Iki - Mv$$

where c is a constant and $Mv$ is the loss moment of the motor which, in a certain configuration of an electric motor, is essentially always the same. Correspondingly, the short circuit moment $Mks$ to be set is also related as follows to the short circuit current $Iks$ to be set:

$$Mks = c*Iks - Mv$$

Since c and $Mv$ need to be determined only once and then always remain the same, a certain short circuit current can always be associated with a desired short circuit moment to be set by way of this relationship. In other words, the short circuit current $Iks$ to be set can be calculated by way of this equation. A corresponding value is then stored in memory 16. If a comparison between the actual short circuit moment and the set short circuit moment indicates that the deviation lies within the desired tolerance range, it is not necessary to predetermine a short circuit current setting. Advisably the actual short circuit current is measured when the constants are calculated for the first time.

Particularly if memory 16 is configured as an electronic memory, the short circuit current setting required for mass production can be predetermined very quickly.

If a control device is already in existence, components that are provided for servomotor 11, such as, for example, electronic switching element 14 or also a current limiting device or a current regulating device may also be employed for the described electronic control device 10. In many cases, the electronic control device 10 may also be integrated in servomotor 11 in order to reduce its structural height and to obtain a compact unit.

It will be understood that the above description of the present invention is susceptible to various modifications, changes and adaptations, and the same are intended to be comprehended within the meaning and range of equivalents of the appended claims.

What is claimed is:

1. A method of setting a short circuit moment in an electric motor, comprising the steps of:
    measuring the actual short circuit moment of the electric motor;
    comparing the actual short circuit moment to a predetermined short circuit moment;
    calculating a set short circuit current, $Iks$, corresponding to a desired set short circuit moment, $Mks$; and
    storing a setting corresponding to the set short circuit current, $Iks$, in an electronic control device for the electric motor.

2. A method according to claim 1, wherein said step of calculating the set short circuit current, $Iks$, is performed according to the following equation:

$$Mks = c*Iks - Mv$$

where c is a constant and $Mv$ is the loss moment of the electric motor.

3. A method according to claim 1, wherein during said step of measuring, an actual short circuit current is measured, corresponding to the actual short circuit moment.

4. A method according to claim 1, further comprising a step of limiting the maximum motor current as a function of the stored setting corresponding to the set short circuit current.

5. A method according to claim 1, further comprising a step of regulating the maximum motor current as a function of the stored setting corresponding to the set short circuit current.

6. A method according to claim 1, wherein said electric motor is a servomotor.

7. A method according to claim 1, wherein said electric motor is an alternating current motor.

8. A method according to claim 1, wherein said electric motor is a three-phase current motor.

* * * * *